United States Patent [19]
Chiang et al.

[11] Patent Number: 5,796,628
[45] Date of Patent: Aug. 18, 1998

[54] DYNAMIC METHOD FOR PREVENTING VOLTAGE COLLAPSE IN ELECTRICAL POWER SYSTEMS

[75] Inventors: Hsiao-Dong Chiang; Cheng-Shan Wang, both of Ithaca, N.Y.

[73] Assignee: Cornell Research Foundation, Inc., Ithaca, N.Y.

[21] Appl. No.: 425,555

[22] Filed: Apr. 20, 1995

[51] Int. Cl.$^6$ ....................................................... H02J 3/14
[52] U.S. Cl. ..................... 364/492; 395/915; 307/29; 307/31; 307/38
[58] Field of Search ........................... 364/492, 493, 364/494, 495; 307/31, 33, 35, 38, 39, 85, 29; 395/907, 915; 323/241, 234

[56] References Cited

U.S. PATENT DOCUMENTS

| | | | |
|---|---|---|---|
| 4,583,182 | 4/1986 | Breddan | 364/492 |
| 4,974,140 | 11/1990 | Iba et al. | 363/74 |
| 5,594,659 | 1/1997 | Schlueter | 364/492 |
| 5,610,834 | 3/1997 | Schlueter | 364/492 |
| 5,625,751 | 4/1997 | Brandwajn et al. | 395/22 |
| 5,629,862 | 5/1997 | Brandwajn et al. | 364/492 |
| 5,638,297 | 6/1997 | Mansour et al. | 364/495 |
| 5,642,000 | 6/1997 | Jean-Jumeau et al. | 307/31 |

OTHER PUBLICATIONS

"Efficient Computational Methods for a Practical Performance Index and the Exact Voltage Collapse Point in Electric Power Systems"; Rene Jean–Jumeau, Hsia–Dong Chiang, Robert J. Thomas, Proceedings of the 31st Conference on Decision and Control, Dec. 1992.

Primary Examiner—Emanuel Todd Voeltz
Assistant Examiner—Tony M. Cole
Attorney, Agent, or Firm—Salzman & Levy

[57] ABSTRACT

Given the current operating condition of a power-generating system (obtained from real-time data), the near-term (e.g., after 25 min.) load demand at each bus (obtained from short-term load forecast) and the generation dispatch (based on economic dispatch), a load margin measure (MW and/or MVAR) is determined in order to assess the system's ability to withstand the forecasted load and generation variations. The invention has a method to predict near-term (e.g., after 25 min.) system voltage profiles. The proposed look-ahead measure and/or the system voltage profiles are then applied to contingency selections for the near-term power system, in terms of load margins to collapse and bus voltage magnitudes. The proposed load margin measure and the voltage profiles are based on the power flow technique and the saddle-node bifurcation theory.

9 Claims, 6 Drawing Sheets

| No. | Case | Load Margin Measure Exact | Load Margin Measure Prop. | Load Margin Ranking Exact | Load Margin Ranking Prop. | Look-ahead Voltage Magnitude Minimum Voltage Exact | Look-ahead Voltage Magnitude Minimum Voltage Prop. | Look-ahead Voltage Magnitude Ranking Exact | Look-ahead Voltage Magnitude Ranking Prop. |
|---|---|---|---|---|---|---|---|---|---|
| 39 | 1055-1228 | 0.23890 | 0.22822 | 1 | 1 | collapse | collapse | | |
| 14 | 1055-2226 | 0.25056 | 0.23132 | 2 | 2 | collapse | collapse | | |
| 40 | 1134-1228 | 0.29300 | 0.28992 | 3 | 3 | collapse | collapse | | |
| 7 | 1097-2285 | 0.43774 | 0.41952 | 4 | 4 | collapse | collapse | | |
| 8 | 1098-2285 | 0.46088 | 0.43892 | 5 | 5 | collapse | collapse | | |
| 42 | 1134-1152 | 0.49230 | 0.46962 | 6 | 6 | collapse | collapse | | |
| 22 | 1003-2200 | 0.78726 | 0.68370 | 7 | 7 | collapse | collapse | | |
| 21 | 1002-2200 | 0.80248 | 0.69054 | 8 | 8 | collapse | collapse | | |
| 15 | 1037-2221 | 1.04826 | 0.87926 | 9 | 10 | collapse | collapse | | |
| 16 | 1039-2221 | 1.07254 | 0.87612 | 10 | 9 | collapse | collapse | | |
| 20 | 2351-1159 | 1.08854 | 0.93246 | 11 | 13 | collapse | collapse | | |
| 10 | 2343-1141 | 1.19042 | 0.92532 | 12 | 12 | collapse | collapse | | |
| 11 | 2343-1142 | 1.22442 | 0.91672 | 13 | 11 | collapse | collapse | | |
| 19 | 2351-1158 | 1.22846 | 0.96466 | 14 | 14 | collapse | collapse | | |
| 9 | 2343-1140 | 1.33370 | 0.97386 | 15 | 15 | collapse | collapse | | |
| 17 | 1037-2220 | 1.49622 | 1.18056 | 16 | 16 | 0.75010 | 0.75608 | 2 | 2 |
| 18 | 1039-2220 | 1.45424 | 1.19898 | 17 | 17 | 0.68841 | 0.69678 | 1 | 1 |
| 25 | 565-940 | 1.62596 | 1.22642 | 18 | 18 | 0.83781 | 0.83211 | 4 | 3 |
| 48 | 1098-1062 | 2.17812 | 1.67198 | 19 | 20 | 0.85298 | 0.85979 | 8 | 8 |
| 27 | 501-935 | 2.24880 | 1.72326 | 20 | 22 | 0.85027 | 0.85759 | 6 | 6 |
| 24 | 1080-2269 | 2.25406 | 1.59172 | 21 | 19 | 0.83498 | 0.84056 | 3 | 4 |
| 28 | 562-935 | 2.28832 | 1.69526 | 22 | 21 | 0.85286 | 0.85971 | 7 | 7 |
| 23 | 1079-2269 | 2.32812 | 1.88166 | 23 | | 0.84139 | 0.84647 | 5 | 5 |
| 46 | 1097-1062 | 2.39608 | 1.76974 | 24 | 23 | 0.87224 | 0.87816 | 9 | 9 |
| 44 | 1062-1152 | 2.48758 | 1.81866 | 25 | 24 | 0.88720 | 0.89261 | 10 | 10 |
| 47 | 1097-1141 | 2.55962 | 1.85682 | 26 | 27 | 0.89641 | 0.90221 | 32 | 33 |
| 45 | 1109-1152 | 2.58874 | 1.83244 | 27 | 25 | 0.89343 | 0.89876 | 11 | 11 |
| 0 | Normal | 2.61190 | 1.89932 | | | 0.894281 | 0.90009 | | 32 |
| 1 | 516-532 | 2.60950 | 1.87350 | | | 0.89379 | 0.89941 | 18 | 16 |
| 2 | 516-533 | 2.60964 | 1.89024 | | | 0.89378 | 0.89950 | 17 | 17 |
| 3 | 516-563 | 2.61106 | 1.87308 | | | 0.89429 | 0.89987 | 23 | 24 |
| 4 | 516-564 | 2.60986 | 1.90418 | | | 0.89422 | 0.89997 | 21 | 27 |
| 5 | 516-587 | 2.60924 | 1.93940 | | | 0.89370 | 0.89972 | 15 | 22 |
| 6 | 516-588 | 2.60914 | 1.88552 | | | 0.89371 | 0.89936 | 16 | 15 |
| 12 | 2343-2344 | 2.61180 | 1.87688 | | | 0.89429 | 0.89991 | 23 | 25 |
| 13 | 1054-2236 | 2.61180 | 1.87688 | | | 0.89429 | 0.89991 | 23 | 25 |
| 26 | 566-940 | 2.61180 | 1.89376 | | | 0.89431 | 0.90004 | 24 | 29 |
| 29 | 1108-2309 | 2.60858 | 1.88954 | | | 0.89382 | 0.89952 | 19 | 18 |
| 30 | 1109-2309 | 2.60708 | 1.86144 | | | 0.89414 | 0.89961 | 20 | 20 |
| 31 | 1110-2309 | 2.60742 | 1.89766 | | | 0.89378 | 0.89956 | 17 | 19 |
| 32 | 1111-2309 | 2.60670 | 1.86562 | | | 0.89422 | 0.89975 | 21 | 23 |
| 33 | 502-556 | 2.60894 | 1.89062 | | | 0.89454 | 0.89993 | 31 | 26 |
| 34 | 503-556 | 2.60914 | 1.89644 | | | 0.89453 | 0.89997 | 30 | 27 |
| 35 | 532-556 | 2.60776 | 1.88888 | | | 0.89357 | 0.89924 | 14 | 14 |
| 36 | 533-556 | 2.60780 | 1.84708 | | 26 | 0.89356 | 0.89897 | 13 | 12 |
| 37 | 556-4088 | 2.61190 | 1.89932 | | | 0.89428 | 0.90009 | 22 | 32 |
| 38 | 556-4089 | 2.61082 | 1.90204 | | | 0.89457 | 0.90006 | | 31 |
| 41 | 1228-2493 | 2.59554 | 1.86326 | | | 0.89347 | 0.89904 | 12 | 13 |
| 43 | 1134-2322 | 2.61172 | 1.88804 | | | 0.89431 | 0.90005 | 25 | 30 |
| 49 | 1098-1140 | 2.59818 | 1.87446 | | | 0.89719 | 0.90287 | 33 | 34 |
| 50 | 1003-1110 | 2.61140 | 1.87826 | | | 0.89434 | 0.89997 | 27 | 27 |
| 51 | 1003-1184 | 2.60908 | 1.89226 | | | 0.89437 | 0.90005 | 28 | 30 |
| 52 | 1002-1158 | 2.60074 | 1.88036 | | | 0.89441 | 0.90000 | 29 | 28 |
| 53 | 1002-1185 | 2.60038 | 1.85878 | | | 0.89433 | 0.89967 | 26 | 21 |

*Figure 6*

DYNAMIC METHOD FOR PREVENTING VOLTAGE COLLAPSE IN ELECTRICAL POWER SYSTEMS

RELATED PATENT APPLICATION

The present patent application is related to co-pending U.S. patent application, Ser. No. 08/055,334 now U.S. Pat. No. 5,642,000; which was filed May 3, 1993, and assigned to a common assignee, the teachings of which are considered as incorporated herein by way of references.

FIELD OF THE INVENTION

The present invention pertains to a method of dynamically determining voltage collapse in electrical power-generating systems and, more particularly, to a method of predicting futuristic or near-term voltage conditions and system weaknesses, in order to prevent the voltage collapse of an electrical power-generating system when it is subjected to heavy-load or contingency conditions.

BACKGROUND OF THE INVENTION

Power blackouts occur around the world with more frequency, as the demand for additional power continues to increase throughout the industrial societies. As each geographic area develops a need for electricity, a new power plant or power distribution system must be constructed. Each power-generating system is unique, because each comprises different grids of power-generating capacity that are strung together to meet the varying power requirements of a given populace and geographic region.

Generally speaking, the power-generating capacities of most systems throughout the world are not keeping pace with the increase in power demand. This situation requires corrective stopgap measures, such as the institution of "brownout" procedures during periods of peak power loads. Brownout procedures can entail the reduction of voltage, as well as the number of cycles being supplied each second. Such procedures can be only a temporary means to alleviate a problem of increased power demand. Eventually, the system will fail, unless the generating power capacity is increased. Even at present, however, the use of brownouts is not an adequate answer to a power shortage problem. Under reduced voltage and/or reduced cycle conditions, certain equipment, such as sensitive electronic devices and computers, simply will not run properly.

Aging power facilities are also a serious problem. Many power plants are currently in need of repair and/or are seriously inefficient. Many power-generation facilities (such as those producing nuclear power) are dangerously outmoded and must be taken off-line. Therefore, many of the existent power-generating systems are actually shrinking in their capacity to furnish power.

Due to economics and the sometimes inordinate amount of time inherent in planning, construction of new generating plants to increase power capacity is not always possible. Even if power-generating capacity were added, it has not been best determined just where in the system the added capacity would provide the most benefit. In other words, there is no present means for determining the so-called "weak areas" in each power-generating system. Despite stopgap measures and the addition of new generating capacity, many systems still fall prey to blackouts. Present-day blackouts result from the industry's inability to predict and correct for these weak areas.

Weak areas are defined as those parts of the grid of a power-generating system that cannot tolerate added load. For example, present-day calculations cannot provide answers as to whether a particular bus can withstand a given increase in load, or whether the system can withstand a simultaneous increase of load on one bus while sustaining an increase in demand on another bus in the grid.

Voltage collapse is generally caused by two types of system disturbances: load variations and contingencies. The voltage collapse in Japan in 1987 was due to load variations; the load collapse in Sweden in 1982 was due to a contingency. Blackouts usually develop in systems that are heavily loaded and which also experience additional power demand.

Prior research in the field of voltage collapse in power-generating systems can be found in the following journal articles:

BIBLIOGRAPHY

[1] Y. Chen and A. Bose, "An adaptive pre-filter for the voltage contingency selection function", *IEEE Trans. on Power Systems*, Vol. 5, No. 4, November 1990, pp. 1478–1656.

[2] A. P. Sakis Meliopoulos, C. S. Cheng, and F. Xia, "Performance evaluation of static security analysis methods", *IEEE Trans. on Power Systems*, Vol. 9, No. 3, August 1994, pp. 1441–1449.

[3] N. Hadjsaid, M. Benahmed, J. Fandino, J. C. Sabonnadiere, and G. Nerin, "Fast contingency screening for voltage-reactive considerations in security analysis", *IEEE Trans. on Power Systems*, Vol. 8, No. 1, February 1993, pp. 144–156.

[4] N. D. Reppen, R. R. Austria, J. A. Uhrin, M. C. Patel, and A. Galatic, "Performance of methods for ranking and evaluation of voltage collapse contingencies applied to a large-scale network", *IEEE/Ntua Athens Power Tech Conference: Planning, Operation and Control of Today's Electric Power System*, Athens, Greece, Sep. 5–8, 1993, pp. 337–355.

[5] J. Zaborszky, K. W. Whang, and K. Prasad, "Fast contingency evaluation using concentric relaxation", *IEEE Trans. on Power Apparatus and Systems*, Vol. PAS99, No. 1, February 1980, pp. 28–36.

[6] V. Brandwajn, "Efficient bounding method for linear contingency analysis", *IEEE Trans. on Power Systems*, Vol. 3, No. 1, February 1988, pp. 38–43.

[7] V. Brandwajn and M. G. Lauby, "Complete bounding method for AC contingency screening", *IEEE Trans. on Power Systems*, Vol. 4, No. 2, May 1989, pp. 724–729.

[8] G. C. Ejebe, H. P. Van Meeteren, and B. F. Wollenberg, "Fast contingency screening and evaluation for voltage security analysis", *IEEE Trans. on Power Systems*, Vol. 3, No. 4, November 1988, pp. 1582–1590.

[9] Y. Chen and A. Bose, "Direct ranking for voltage contingency selection", *IEEE Trans. on Power Systems*, Vol. 3, No. 4, November 1988, pp. 1335–1344.

[10] M. G. Lauby, "Evaluation of a local DC load flow screening method for branch contingency selection of overloads" *IEEE Trans. on Power Systems*, Vol. 3, No. 3, August 1988, pp. 923–928.

[11] R. Bacher and W. F. Tinney, "Faster local power flow solutions", *IEEE Trans. on Power Systems*, Vol. PWRS-4, No. 3, November 1989, p. 1345–1362.

[12] W. F. Tinney, V. Brandwajn, and S. M. Chan, "Sparse vector methods", *IEEE Trans. on Power Apparatus and Systems*, Vol. PAS-104, No. 2, February 1985, pp. 295–301.

[13] B. Stott, O. Alsac and F. L. Alvarado, "Analytical and computations improvements in performance-index ranking algorithms for networks", *International Journal of Electrical Power and Energy Systems*, Vol. 7, July 1985, pp. 154–160.

[14] V. Brandwajn, Y. Liu, and M. G. Lauby, "Pre-screening of single contingencies causing network topology changes", *Paper 90 SM487-9-PWRS, PES Summer Meeting 1990.*

[15] N. Flatabo, O. B. Fosso, R. Ognedal, T. Carlsen, and K. R. Heggland, "A method for calculation of margins to voltage instability applied on the Norwegian system for maintaining required security level", *IEEE Trans. on Power Systems*, Vol. 8, No. 3, August 1993, pp. 920–928.

[16] H. D. Chiang and Rene Jean-Jumeau, "Toward a Practical Performance Index for Predicting Voltage Collapse in Electric Power System", *IEEE 1993 Summer Power Meeting 93-SM512-4 PWRS.*

[17] H. D. Chiang, A. J. Flueck, K. S. Shah and N. Balu, "CPFLOW: A Practical Tool for Tracing Power System Steady-State Stationary Behavior Due to Load and Generation Variations", *IEEE Winter Power Meeting.*

In a previously filed U.S. patent application, Ser. No. 08/055,334; filed May 3, 1993, and assigned to a common assignee, a method was described that determines a performance index for each power-generating system. For the first time, system performance was directly correlated to load demands. This performance index could be easily interpreted by power engineers and operators, so that weak areas and potential voltage collapse conditions could be predicted and corrected.

When the underlying cause of collapse is due to load variations, the performance index described in the above-identified patent application had the ability to measure the amount of load increase that the system could tolerate prior to such a collapse.

When the underlying collapse mechanism was due to a contingency, the performance index of the above-identified invention could measure its severity. The performance index of the prior invention could also assess whether the system could sustain a contingency without collapse.

While the above-identified patent application describes a useful method of determining weaknesses of a particular power-generating system, it is of interest to note that the procedure is essentially a snapshot technique. The results obtained apply only to immediate conditions and have no predictability with respect to near-term conditions, e.g., conditions that prevail 25 minutes after contingencies may develop.

The method of the present invention reflects the knowledge that it would be desirable and, in fact, more useful to use the saddle-node bifurcation technique described in the aforesaid patent application, in order to provide futuristic voltage profiles of an electrical power-generating system. It has already been determined that a contingency that may often prove insignificant at time zero may prove troublesome at some later time, i.e., it may cause voltage collapse as the system continues to evolve along a predicted direction of load-generation variation.

The method of this invention is an improvement upon the method of the previous patent application. The current invention uses a dynamic calculation to plot power flow vs. system load generation curves for different system contingencies and load variations with respect to time. The new method provides a means by which load shedding or power-generating additions can be more accurately optimized to prevent system collapse. This new dynamic technique determines near-term conditions and, therefore, can dynamically predict the changing stability of the system, thus providing an assessment of the system's post-contingency or load variation weaknesses.

The dynamic method of voltage-collapse prevention and power-generation maintenance of the current invention comprises the general steps:

a) forecasting near-term power flows utilizing a saddle-node theory for a power-generating system having a power-generating grid;

b) determining, from forecasts in step (a), load margin value indices that provide an assessment of load demand that said generating system can withstand before saddle-node voltage collapse; and c) maintaining power-generating capacity of said power-generating system by preventing voltage collapse of said power-generating system by adding power-generating capacity or shedding load to certain portions of said power-generating grid, utilizing assessments based on said load margin value indices obtained in step (b), said load margin value indices identifying weak areas of said power-generating system, thus making possible continued power-generation maintenance for said power-generating system.

The aforementioned method also contemplates, as an alternative to step (c), the step (d) of applying the load margin indices obtained in step (b) in order to obtain system voltage profiles for said power-generating system. Said voltage profiles can be utilized for maintaining the power-generating capacity of said power-generating system.

SUMMARY OF THE INVENTION

In accordance with the present invention, there is provided a dynamic method of preventing voltage collapse in a power-generating system. Load demands are measured with respect to time in a power-generating system having a power-generating grid. Then a performance index, directly correlated to load demands, is calculated. The performance index is used to identify weak areas in the power-generating system. Voltage profiles are generated for the power-generating system. Power is shed or generating capacity is added, if necessary, in those portions of the power-generating grid of said power-generating system that are identified as weak areas, in order to prevent voltage collapse in the power-generating system.

The invention also establishes a direct relationship between its performance index and the load demands. Such a relationship thus makes practical the assessment of the status of the grid system by operators, thereby allowing them to easily avoid a potential voltage collapse.

BRIEF DESCRIPTION OF THE DRAWINGS

A complete understanding of the present invention may be obtained by reference to the accompanying drawings, when considered in conjunction with the subsequent detailed description, in which:

FIG. 6 is a table of load margin measure, voltage prediction and their comparisons with the results obtained from exact methods and look-ahead rankings in terms of load margin and voltage magnitude on a 1-069-bus power system.

DESCRIPTION OF THE PREFERRED EMBODIMENT

Generally speaking, contingency selection and contingency analysis are basic functions of modern energy management systems. The strategy of using an efficient contingency selection function to filter out a large number of low-severe contingencies and applying detailed power flow analysis only to high-severe contingencies is widely accepted. In the last decade, significant progress has been made in the development of algorithms for both real power contingency selection and voltage contingency selection.

Figure 1:
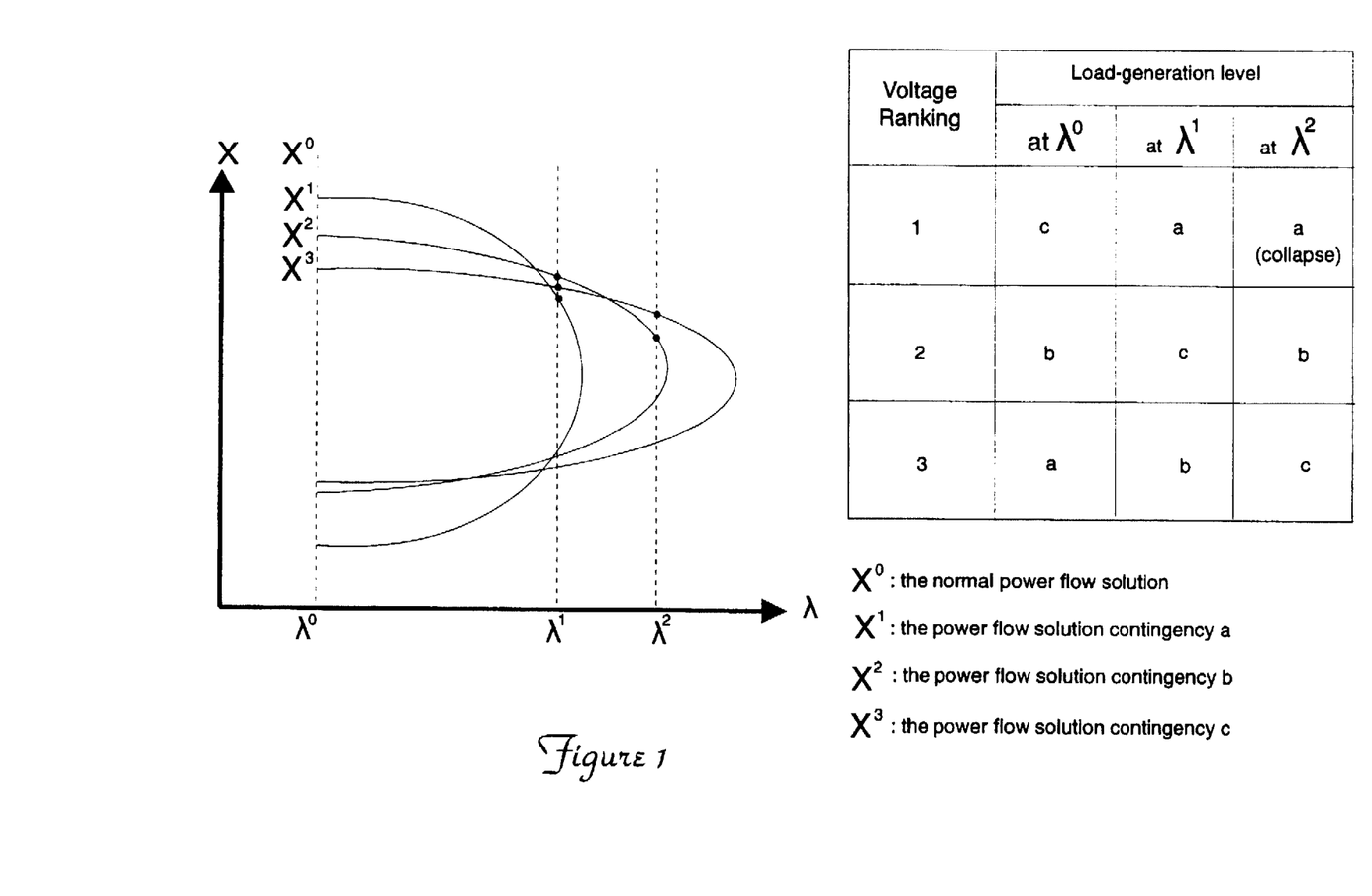
FIG. 1 illustrates a variety of graphically expressed power flow curves that are dependent upon various contingencies.

A great majority of existing algorithms for contingency selection provide only a snapshot analysis of a power system. Under normal operating conditions, this practice seems to be adequate. But, as the power system evolves due to load variations and generation rescheduling, the contingency ranking based on the snapshot analysis may become insufficient or, in the worst case, irrelevant when the power system is operated close to its stability limit. To elaborate on this point and to illustrate the motivation for developing look-ahead contingency selection functions, consider a simple situation: Suppose that a power system is subject to three contingencies, say, "a", "b" and "c". The effects of these contingencies on the P-Q-V curves, which were derived based on a predicted load variation and a scheduled generation dispatch, are shown in FIG. 1. Consider the problem of ranking these contingencies according to their severities. Given the current operating point, the snapshot contingency ranking is of the order "c", "b", "a". Contingency "a", which was classified to be the least severe according to the snapshot contingency ranking when the system load-generation is at the level $\lambda^0$, will cause a voltage problem when the system evolves to the level $\lambda^1$. Furthermore, the contingency "a", which was classified to be the least severe, will cause a voltage collapse even before the system reaches the load-generation level $\lambda^2$, provided that the system continues to evolve in the predicted direction of load-generation variation.

It may be argued that the contingency "a" will be captured by the snapshot contingency selection anyway, when the system is operated at the load-generation level $\lambda^1$. The point is that it depends on two factors: (i) how often the functions of contingency selection and contingency analysis are performed, and (ii) the rate of load variations. If these functions were performed when the system load-generation is at the level $\lambda^0$ and then performed at the level $\lambda^2$, then the contingency "a" will cause voltage problems when the system evolves through the load-generation level $\lambda^1$. When the system is operated close to its stability limit, the scenario presented in the abovementioned example might occur.

Figure 2:
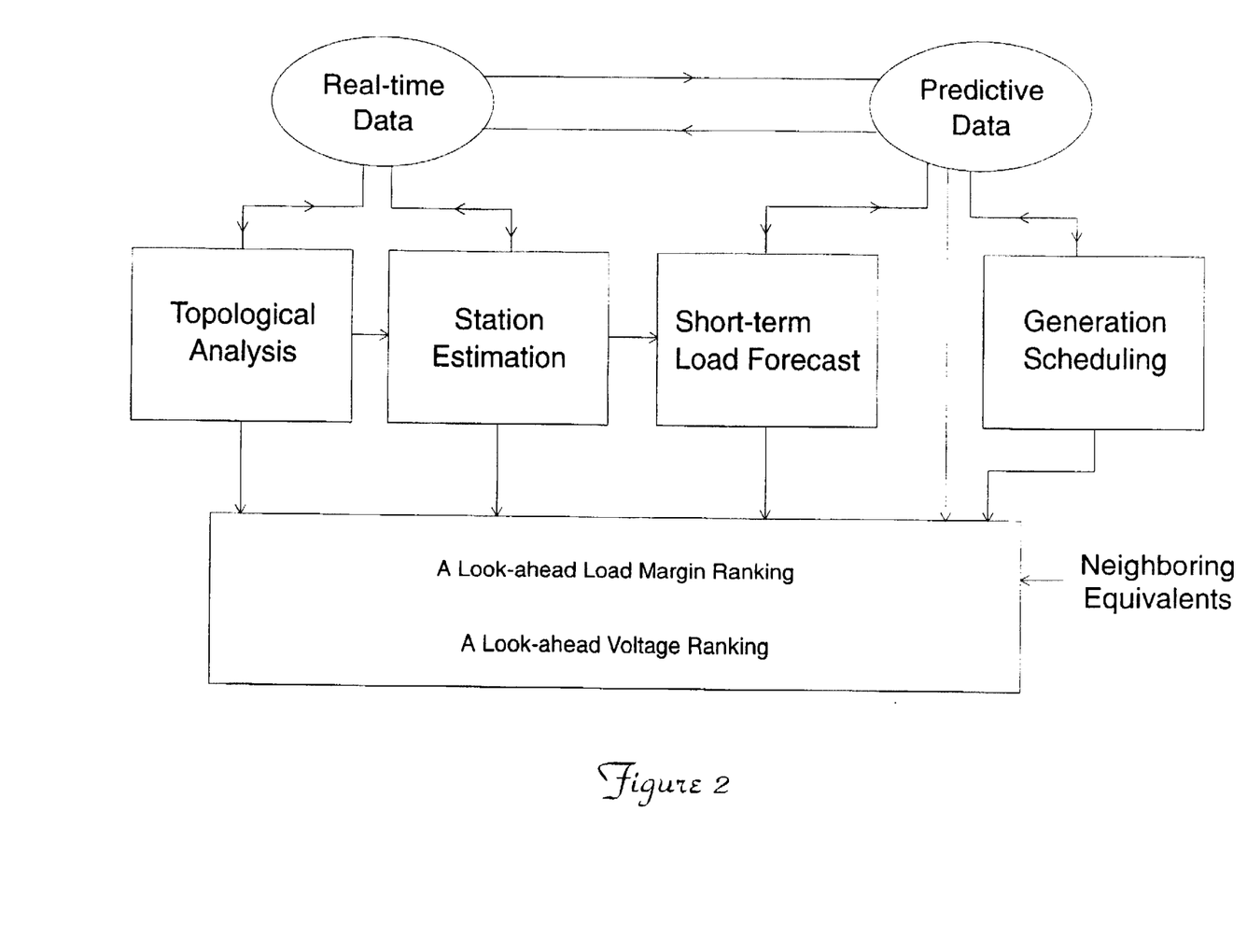
FIG. 2 depicts a block diagram of the method of this invention wherein two functions are added together: (a) a look-ahead load margin ranking, and (b) a look-ahead voltage ranking, in order to provide an energy management system.

Given the current operating condition (obtained from the state estimator and the topological analyzer), the near-term (say, after 25 min.) load demand at each bus (obtained from predictive data and the short-term load forecaster) and the generation dispatch (say, based on economic dispatch), a load margin measure or index (MW and/or MVAR) can be used to assess the system's ability to withstand both the forecasted load and generation variations. A method is presented to predict near-term system voltage profiles. The proposed look-ahead measure and the proposed profile method are then applied to contingency selections for the near-term power system, in terms of load margins to collapse and bus voltage magnitudes (see FIG. 2). The proposed look-ahead measure and the proposed voltage prediction method augment the current contingency selection function by adding the look-ahead capability thereinto. The look-ahead capability can be useful when the system is operated close to its stability limit or the rate of load-generation variations is high. Evaluating the test results on several power systems, including an 1169-bus power system with 53 contingencies, was promising. The proposed load margin measure or index is based on the power flow solutions and the normal form of the saddle-node bifurcation point. The proposed voltage prediction method is based on the power flow technique and characteristic equations of the saddle-node bifurcation point.

Since the proposed measure and the proposed voltage prediction method considerably utilize the power flow solutions provided by CPFLOW, it is necessary to give an overview of CPFLOW. CPFLOW (Continuation Power Flow) is a comprehensive tool for tracing power system steady-state behavior due to load and generation variations. (H. D. Chiang, A. J. Flueck, K. S. Shah and N. Balu, "CPFLOW: A Practical Tool for Tracing Power System Steady-State Stationary Behavior Due to Load and Generation Variations", *IEEE Winter Power Meeting*). In particular, CPFLOW can generate P-V, Q-V and P-Q-V curves having as a capability the controlling parameter $\lambda$ being one of the following: (i) general bus (P and/or Q) loads+real power generation at P-V buses, (ii) area (P and/or Q) loads+real power generation at P-V buses, (iii) system (P and/or Q) loads+real power generation at P-V buses. CPFLOW can trace the power flow solution curve, with respect to any of the above three varying parameters, through the "nose" point (i.e., the saddle-node bifurcation point) without numerical difficulties.

CPFLOW uses a predictor-corrector type of continuation method in conjunction with a step-size control in order to achieve high computational efficiency. The purpose of the predictor is to find an approximation point for the next solution. The quality of the approximation point by a predictor significantly affects the number of iterations required by a corrector in order to obtain an exact solution. A better approximation point yields fewer iterations necessary in a corrector to reach the solution. Ideally, the step length should be adapted to the shape of the solution curve to be traced: a larger step-length should be used in the "flat" part of the solution curve and smaller step-length in the "curly" part (that part having a high degree of curvature) of the solution curve. The shape of the solution curve is unknown beforehand, making the task of designing an effective step-length control difficult. Thus, good step-length controls are usually custom-designed for specific applications. Despite this, some general considerations may be implemented in the continuation procedure in order to improve its performance.

A New Performance Index

One basic criterion of useful performance indices is their ability to reflect the degree of direct mechanism leading the underlying system toward an undesired state. In the context of voltage collapse in power systems, a useful performance index must have the ability to measure the amount of load increase that the system can tolerate before collapse (when the underlying mechanism of collapse is due to load variations), and assess whether the system can sustain a contingency without collapse (when the underlying mechanism of collapse is caused by a contingency), as well as measure the severity thereof.

In, H. D. Chiang and Rene Jean-Jumeau, "Toward a Practical Performance Index for Predicting Voltage Collapse in Electric Power System", *IEEE 1993 Summer Power Meeting 93-SM512-4 PWRS*, a new performance index was developed that provides a direct relationship between its value and the amount of load demand that the system can withstand before a saddle-node voltage collapse. This index makes use of the information contained in the power flow solutions of the particular branch of interest. This performance index is particularly useful for power systems with sufficient system damping. One of the features that distinguishes the proposed performance is its development in the load-demand space and its ability to answer questions such as, "Can the system withstand a simultaneous increase of 70 MW on bus 2 and 50 MVar on bus 6?" Moreover, the computation involved in the performance index is relatively inexpensive in comparison with those required in existing indices. However, the performance index developed by Chiang and Jean-Jumeau, supra, may have numerical instability problems.

The new performance index of this invention provides a direct load margin measure (i.e., MW and/or MVAR) between the current point and the nose point. The new performance index has no numerical instability problems.

Theoretical Basis

The idea of using appropriate coordinate transformations to simplify the expression of a set of complicated equations has proven powerful. Along this line, the normal form method transforms a set of nonlinear differential equations into a few terms of the power series of the original equations in the neighborhood of an equilibrium point or a periodic solution. The few initial terms provide significant information on the behavior of solutions.

The method of normal forms is also a powerful tool in the study of bifurcations. When the normal form theory is applied to the saddle-node bifurcation, it can be shown that the following equation is the normal form for the saddle-node bifurcation:

$$\dot{x} = u - x^2, \quad (1)$$

where $u \in R^1$. Roughly speaking, this theoretical result states, in the context of power flow equations, that the power flow solution curve passing through the nose point is a quadratic curve, at least locally.

A New Index

Figure 3:
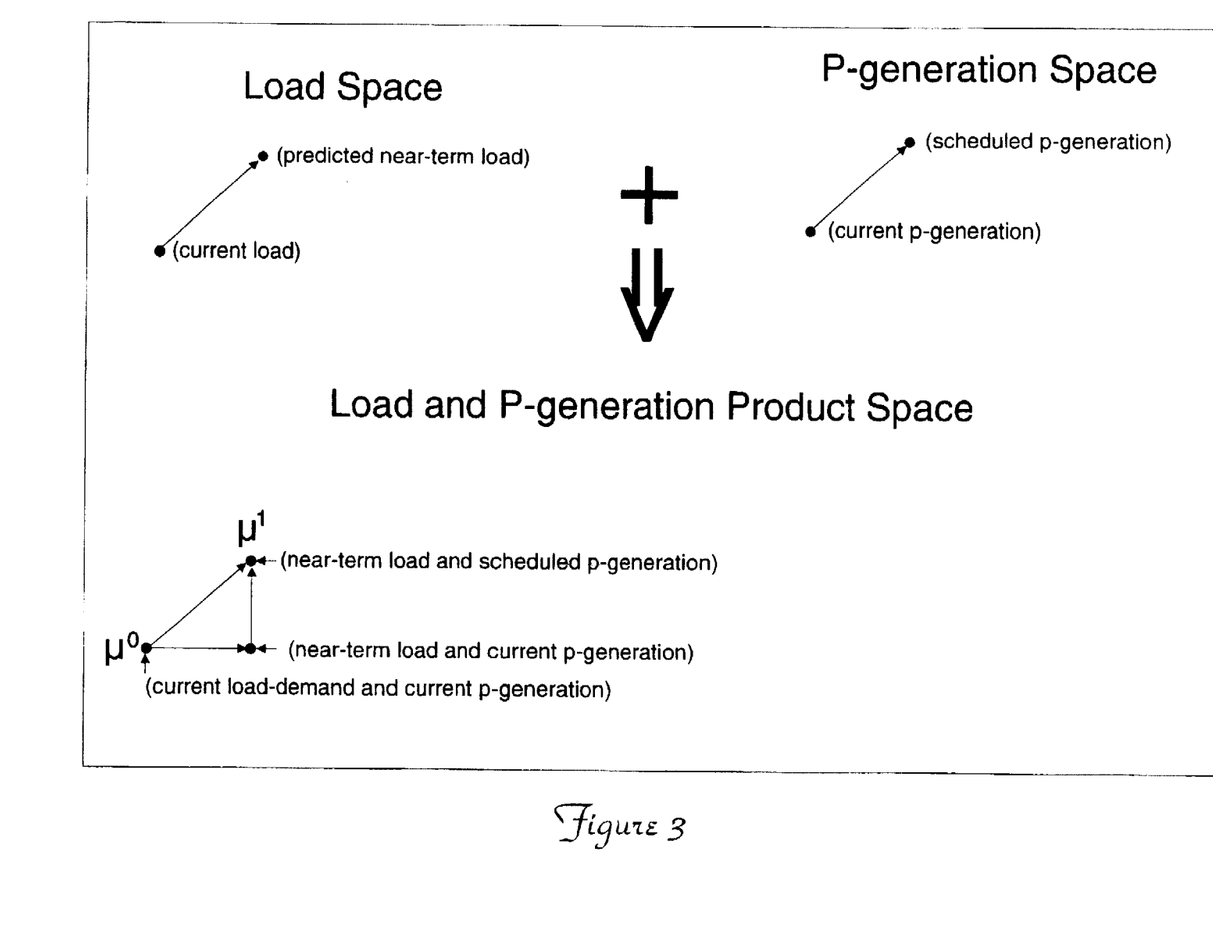
FIG. 3 shows in graphical form the parameterized variations for both the real and reactive load demands, as well as the real power generation.

Starting from a power flow solution, say, $x_1$, with the corresponding parameter value $\lambda_1$, two other power flow solutions are computed along the load-generation curve (see FIG. 3) specified by the predicted near-term load and the scheduled real power generations at two different parameter values, say, at $\lambda_2$ and $\lambda_3$, using CPFLOW. (Note that the step-size selection of CPFLOW will determine the value of $\lambda_2$ and $\lambda_3$.) Let these two power flow solutions be $x_2$ and $X_3$. Pick one load bus whose drop in voltage magnitude is the largest; let this bus be labeled i. Assume the following quadratic curve $$\lambda = \alpha + \beta V_i + \gamma V_i^2 \quad (2)$$

to fit the three points of bus i, $(V_{1,i}, \lambda_1)$, $(V_{2,i}, \lambda_2)$ and $(V_{3,i}, \lambda_3)$. (Note that the theoretical basis of the quadratic curve is the normal form of the saddle-node bifurcation point.) Obtain the values for parameter $\alpha, \beta$ and $\gamma$. From these three values and the quadratic curve, the invention proposes the following load-margin measure, a performance index that provides a direct relationship between its value and the amount of load demand that the system can withstand before a saddle-node voltage collapse.

$$\lambda_{V max} = \alpha - \frac{\beta^2}{4\gamma} \quad (3)$$

Remarks

1. This index makes use of the information contained in the power flow solutions of the particular branch of interest.
2. If one of the load buses has a significant drop in angle magnitude, the above procedure can be repeated to obtain a measure, say, $\lambda_{\theta\ max}$. In this situation, the load-margin measure should be modified accordingly, in the sense that $\lambda_{max} = 0.5(\lambda_{V\ max} + \lambda_{\theta\ max})$; otherwise, $\lambda_{max} = \lambda_{V\ max}$.

Voltage Prediction

Making use of the information contained in the $\lambda$-V curve and a characteristic equation for the saddle-node bifurcation point, the voltage magnitude of each bus is predicted at any given $\lambda$ between the current value $\lambda_1$ and the maximum value $\lambda_{max}$. The key point of the method is that a quadratic curve is assumed for each bus to approximate the $\lambda$-V curve of the bus for the range between $\lambda_1$ and $\lambda_{max}$. Use the information of $\lambda_1$, $x_1$, $\lambda_3$, $x_3$ and $\lambda_{max}$ (the load-margin measure), and a characteristic equation to determine the corresponding quadratic curve for each bus, say, bus j, and the bus voltage at $\lambda_{max}$, denoted by $V_{max,j}$ in the following way:

$$\lambda_1 = \alpha_j + \beta_j V_{1,j} + \gamma_j V_{1,j}^2$$

$$\lambda_3 = \alpha_j + \beta_j V_{3,j} + \gamma_j V_{3,j}^2$$

$$\lambda_{max} = \alpha_j + \beta_j V_{max,j} + \gamma_j V^2_{max,j}$$

$$0 = \beta_j + 2\gamma_j V_{max,j}$$

The last equation, which is a characteristic equation for the nose point, states that the sensitivity of voltage with respect to the load increase at the nose point is infinite. From the above four equations, one can obtain the values $\alpha_j$, $\beta_j$, $\gamma_j$ and $V_{max,j}$. Consequently, one can predict the bus voltage magnitude $V_j$, for any parameter value $\lambda$ between $\lambda_1$ and $\lambda_{max}$, by using the following equation:

$$\lambda = \alpha_j + \beta_j V_j + \gamma_j V_j^2 \quad (4)$$

Numerical Studies

Test results on the New England 39-bus power system and an 1169-bus power system are presented. The 1169 bus network is also an actual dataset modeling a transmission network. This system is used to demonstrate the applicability of the proposed look-ahead voltage and load margin measures, as well as rankings, when applied to very large-scale systems.

A typical power system is considered, with n load buses supplied by m generators and one slack bus. The representative nonlinear equations have the form:

$$F(x, \lambda) = f(x) - \lambda b, \quad (5)$$

where $b = \Sigma_{i \in J} w_i e_i$, $J \subset \{(1, 2, \ldots, (2n+m)\}$, $w_i \in R$ and the $e_i$ are the $i^{th}$ standard unit vectors. This formulation models the variation of the real and reactive power demand at some collection of load buses, the variation of the real power generation at some collection of generator buses; these variations can be parameterized, while the others are fixed (see FIG. 3). In the real time environment, security analysis is carried out periodically with a cycle time of about 15 to 25 minutes. During each cycle, system structure and operating state are first identified and modeled by the state estimator and external model, which generate a power flow model and the corresponding power flow solution referred to as the base case of this cycle. In equation 5, "b" can be determined by the difference in base case and the short term load forecast for the next forecasting period. In voltage collapse contingency ranking for the two sample systems, the reactive and real power demand on multiple buses are assumed to change; only branch outage contingencies are considered.

TABLE 1

The pattern of load variations at all load buses from the current load demand pattern to the forecasted near-term (25 minutes) load demand pattern

| Bus No. | Current Load Demand | | Load Variations after 25 min | |
|---|---|---|---|---|
| | P | Q | P | Q |
| 3 | 322 | 2.4 | 437.9 | 5.57 |
| 4 | 500 | 184 | 666.7 | 232.4 |
| 7 | 233.8 | 84 | 344.8 | 90.7 |
| 8 | 522 | 176 | 721.3 | 227.7 |
| 12 | 8.5 | 88 | 13.3 | 134.7 |
| 15 | 320 | 153 | 436.7 | 172.6 |
| 16 | 329.4 | 32.3 | 358.8 | 39.7 |
| 18 | 158 | 30 | 258.9 | 100.9 |
| 20 | 680 | 103 | 1021.8 | 143.4 |
| 21 | 274 | 115 | 368.2 | 192.1 |
| 23 | 247.5 | 84.6 | 240.2 | 74.3 |
| 24 | 308.6 | −92.2 | 388.4 | −91.3 |
| 25 | 224 | 47.2 | 322.3 | 69.2 |
| 26 | 139 | 17 | 206.1 | 22.4 |
| 27 | 281 | 75.5 | 247.2 | 64.9 |
| 28 | 206 | 27.6 | 203.5 | 24.4 |
| 29 | 283.5 | 26.9 | 415.4 | 40.7 |

TABLE 2

A comparison between the proposed method and the exact method in determining load margin to collapse. Note that the errors in all cases are within 5 percent

| No. | Case | $\lambda_{max}$ | $\tilde{\lambda}_{max}$ | Err % |
|---|---|---|---|---|
| 0 | normal | 1.07407 | 1.12312 | −4.56757 |
| 1 | 28–29 | 1.06441 | 1.09943 | −3.29093 |
| 2 | 26–29 | 1.06928 | 1.11936 | −4.68315 |
| 3 | 26–28 | 1.07059 | 1.11707 | −4.34172 |
| 5 | 26–27 | 1.05336 | 1.08745 | −3.23614 |
| 8 | 2–3 | 0.99057 | 1.01262 | −2.22518 |
| 10 | 8–9 | 0.95265 | 0.99027 | −3.94935 |
| 13 | 10–13 | 0.97244 | 0.98458 | −1.24903 |
| 14 | 4–5 | 0.92652 | 0.94319 | −1.79914 |
| 15 | 13–14 | 0.92713 | 0.93206 | −0.53128 |
| 20 | 5–6 | 0.90371 | 0.90045 | 0.36074 |
| 26 | 6–7 | 0.99023 | 1.01480 | −2.48093 |
| 27 | 5–8 | 1.03590 | 1.06845 | −3.14229 |
| 28 | 9–39 | 0.95961 | 0.98990 | −3.15680 |
| 29 | 25–26 | 1.06358 | 1.10123 | −3.53963 |
| 30 | 21–22 | 1.02437 | 1.04868 | −2.37376 |

New England 39-bus system

Table 1 indicates the load condition at base case and at the end of a forecasting period of 25 minutes. Corresponding to the two states in Table 1, the value of parameter $\lambda$ is, respectively, 0.0 and 1.0. Table 2 shows the exact values and the estimated values of the parameter $\lambda$ at the saddle-node bifurcation point (SNBP) for some line outage contingencies in the system. The exact value $\lambda_{max}$ is the result from CPFLOW. The estimated value $\tilde{\lambda}_{max}$ is computed using the load-margin performance index proposed in the previous section. In order to use a quadratic function to fit a $\lambda$-V or $\lambda$- $\theta$ curve, three points on the curve are needed. The accuracy of the estimate is related to the position of these three points. In Table 2, the $\tilde{\lambda}_{max}$ is obtained using three points on both the $\lambda$- $\theta$ and $\lambda$-V curves with $\lambda_1,\lambda_2,\lambda_3$ less than 0.11. The error between $\lambda_{max}$ and $\tilde{\lambda}_{max}$ is defined as $$\text{Error \%} = \frac{100 \times (\lambda_{max} - \tilde{\lambda}_{max})}{\lambda_{max}} \quad (6)$$

It should be pointed out that, when $\lambda_1$ is fixed and $\lambda_2,\lambda_3$ are increased gradually to $\lambda_{max}$ the error will decrease gradually to zero, which has been proved by a large amount of computation with different power systems. For this sample system, when the load at different buses is changed in accordance with the given pattern of increase, the voltage magnitude v and angle $\theta$ at some load buses will experience a big change. So the $\lambda$-V and $\lambda$- $\theta$ curves at these load buses can all be used to estimate $\lambda_{max}$. From computational practice, it has been observed that $\lambda_{vmax}$ underestimates $\lambda_{max}$ ,and $\lambda_{\theta max}$ overestimates $\lambda_{max}$. The average of $\lambda_{\theta max}$ and $\lambda_{vmax}$ from $\lambda$-V and $\lambda$- $\theta$ curves will greatly improve the estimation accuracy.

The estimated value of $\lambda_{max}$ can be used as an approximation of the exact margin, in the load-space, to voltage collapse. A contingency is classified as a voltage collapse case when the system evolves to the forecasted load level, if the post-contingency $\lambda_{max}$ is less than the forecasted value $\lambda_f=1.0$. The estimated value of $\lambda_{max}$ can be used to rank the contingencies. For those contingencies having estimated values of $\lambda_{max}$ greater than 1.0, the lowest voltage at $\lambda_f$ is used to rank the contingencies, where the voltage can be estimated by the quadratic function used in estimating $\lambda_{max}$. The proposed load margin ranking and look-ahead voltage ranking strategies are demonstrated via simulations on an 1169-bus power system.

1169-bus system

There are 624 loads in this system. Due to space limitations, one numerical simulation examining real and reactive power changes at twenty-seven buses is presented. In FIG. 6 the index of voltage collapse and the estimated look-ahead voltages for different contingencies are shown. The ordering of these contingencies based on the inventive method and the results from CPFLOW are also shown thereon. It is observed from FIG. 6 that the two methods yield a similar contingency ranking result. Although the error between the exact margin $\lambda_{max}$ and the estimated margin $\tilde{\lambda}_{max}$ is not very satisfactory, in comparison with the 39-bus system in this sample system, the contingency ranking result for the collapse case is still accurate because a lot of contingencies in the system have caused large changes in the margin $\lambda_{max}$. This situation is often encountered when a power system is under heavy-load conditions. In fact, FIG.6 shows that the ranking results by two methods, based on voltage collapse margin, are nearly the same when $\lambda_{max}$ is less than 1.29437. Because their margins of voltage collapse are very close to the margin at base case, the ranking for contingency cases with $\lambda_{max}$ larger than 1.29437 is not important for security analysis. It is also apparent that the ranking results by the two methods for the marginal cases are nearly identical. In the numerical simulation for this sample system, only the λ-V curve at one load bus with the largest voltage drop is used to estimate $\lambda_{max}$ and compute the look-ahead voltage. The voltage angle θ at each load bus in this simulation changes very little, and the λ-θ curve cannot be fit appropriately by a quadratic function. Since not enough information can be extracted from the λ-θ curve to improve the accuracy of estimating $\lambda_{max}$, the error is larger. Due to the conservative underestimation of $\lambda_{max}$ calculated only from a λ-V curve, more contingency cases will be diagnosed as voltage collapse cases than would actually lead to voltage collapse in practice. However, planning corrective action for the extra contingencies can only improve power system security. Above all, an accurate relative ranking of the contingencies is the most important issue. The performance of the inventive method is very encouraging.

Figure 4:
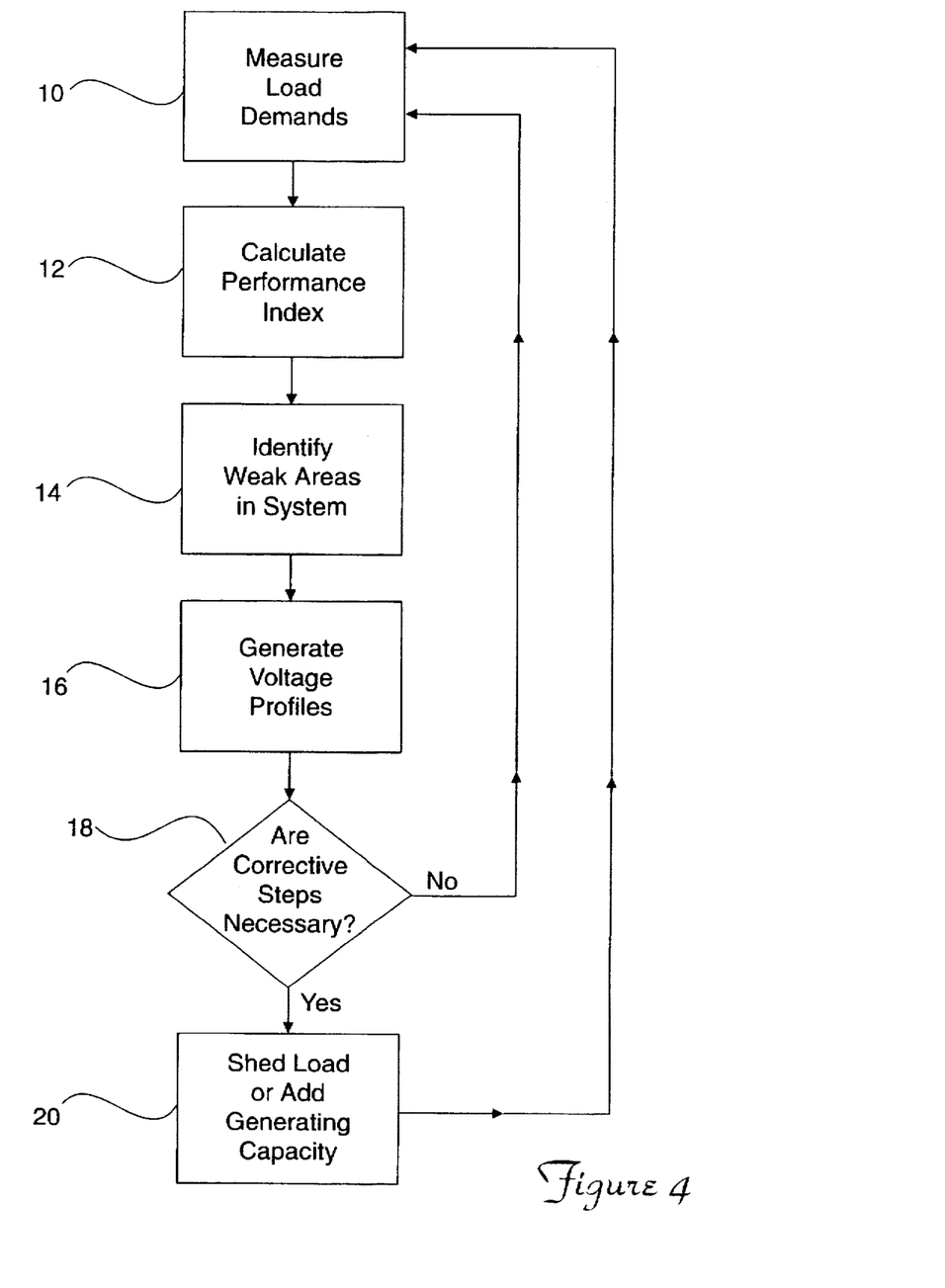
FIG. 4 is a flow chart of the method of the present invention.

The dynamic method of preventing voltage collapse in a power-generating system, in accordance with this invention, is shown in the flow chart of FIG. 4. Load demands are measured with respect to time in a power-generating system having a power-generating grid, step 10. Then a performance index, directly correlated to load demands, is calculated, step 12. The performance index is used to identify weak areas in the power-generating system, step 14. Voltage profiles are generated for the power-generating system, step 16. If corrective action is required, step 18, load is shed or generating capacity is added, step 20, in those portions of the power-generating grid of the power-generating system that are identified as weak areas, in order to prevent voltage collapse in the power-generating system.

Figure 5:
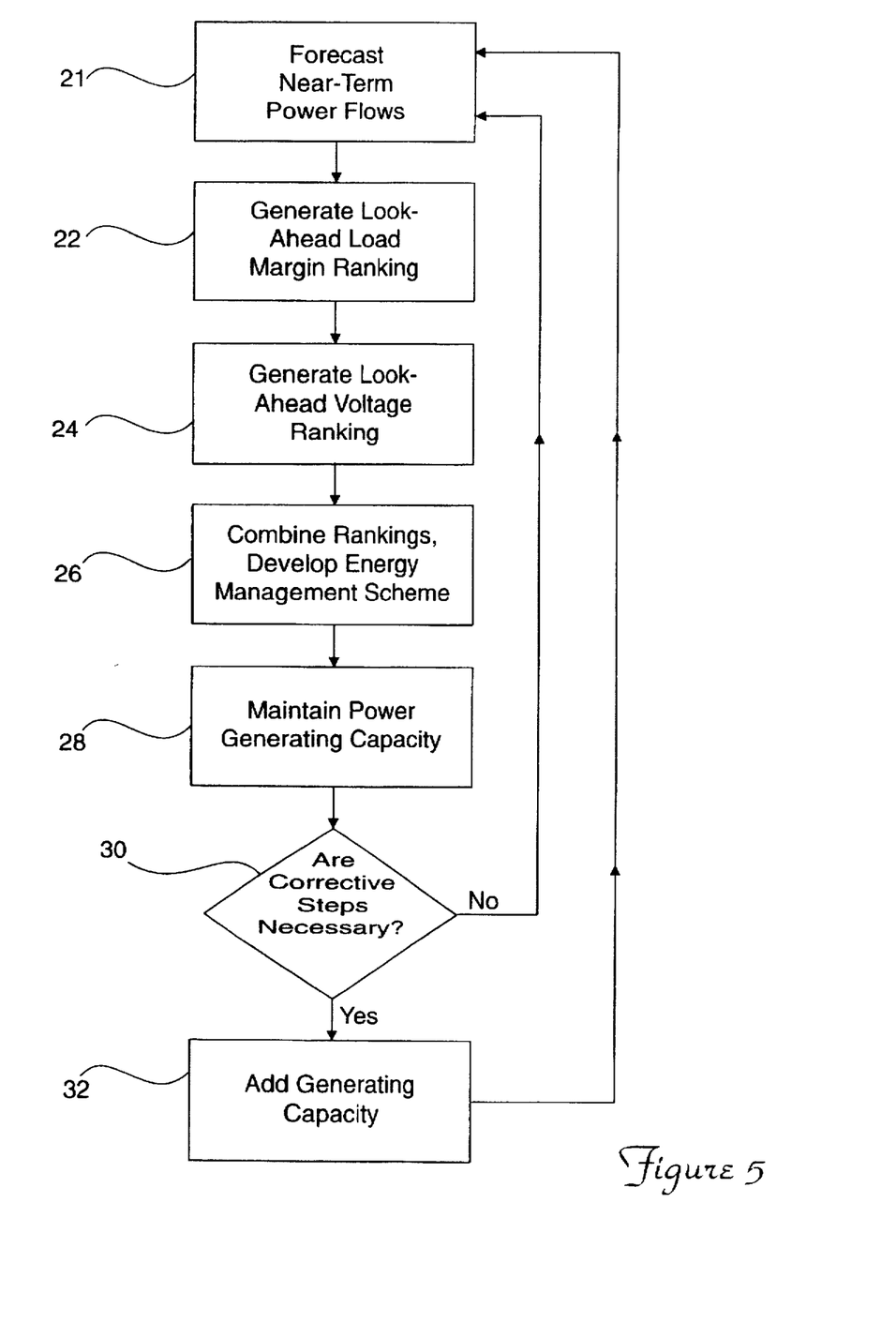
FIG. 5 is a flow chart of the method of the present invention using look-ahead rankings to provide energy management schemes to prevent voltage collapse.

Referring now to FIG. 5, there is shown a flow chart depicting the method of this invention to prevent voltage collapse in a power-generating system. Near-term power flows are forecast, step 21, utilizing a saddle-node theory. A look-ahead load margin ranking is then generated from that forecast, step 22. A look-ahead voltage ranking is also generated, step 24. The look-ahead load margin ranking is combined with the look-ahead voltage ranking, step 26, to provide an energy management scheme for the power-generating system so that voltage collapse will be prevented. Of course, the power-generating capacity of the power-generating system is maintained, step 28, by preventing voltage collapse of the power-generating system based on the load demand assessment. If required, step 30, adding power-generating capacity to a grid of the system, step 32, is appropriately performed.

CONCLUSION

Given the current operating condition (obtained from the state estimator and the topological analyzer), the near-term (say, after 25 min.) load demand at each bus (obtained from predictive data and the short-term load forecaster) and the generation dispatch (say, based on economic dispatch), a load margin measure (MW and/or MVAR) is used to assess the system's ability to withstand both the forecasted load and generation variations. A method to predict near-term system voltage profiles is also used. The proposed look-ahead measure and the proposed voltage profile method are then applied to contingency selections for the near-term power system, in terms of load margins to collapse and bus voltage magnitudes. The proposed look-ahead measure and the proposed voltage prediction method can augment the current contingency selection function by adding the look-ahead capability thereinto. The look-ahead capability can be useful when the system is operated close to its stability limit, or the rate of load-generation variations is high. The results on several power systems, including an 1169-bus power system with 53 contingencies, show promising results. The proposed load margin measure is based on the power flow solutions and the normal form of the saddle-node bifurcation point. The proposed voltage prediction method is based on the power flow technique and characteristic equations of the saddle-node bifurcation point.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A dynamic method of preventing voltage collapse in a power-generating system, comprising the steps of:

a) measuring the load demands with respect to time in a power-generating system having a power-generating grid in order to provide look-ahead load demands;

b) calculating a performance index directly correlated to the look-ahead load demands obtained in step (a);

c) utilizing the performance index to identify weak areas in the power-generating system;

d) generating voltage profiles, which are dynamic and revisable over time, for said power-generating system in order to properly maintain said power-generating system; and e) shedding load in those portions of the power-generating grid of said power-generating system that are identified as weak areas, in order to prevent voltage collapse in the power-generating system in accordance with said dynamic voltage profiles.

2. The dynamic method of preventing voltage collapse in a power-generating system in accordance with claim 1, wherein reactive power is simultaneously varied on at least two of a plurality of buses in a grid of said power-generating system.

3. A dynamic method of preventing voltage collapse in a power-generating system, comprising the steps of:

a) measuring the load demands with respect to time in a power-generating system having a power-generating grid in order to provide look-ahead load demands;

b) calculating a performance index directly correlated to the look-ahead load demands obtained in step (a);

c) utilizing the performance index to identify weak areas in the power-generating system;

d) generating voltage profiles, which are dynamic and revisable over time, for said power-generating system in order to properly maintain said power-generating system; and e) adding additional power-generating capacity in those portions of the power-generating grid of said power-generating system that are identified as weak areas, in order to prevent voltage collapse in the power-generating system in accordance with said dynamic voltage profiles.

4. The dynamic method of preventing voltage collapse in a power-generating system in accordance with claim 3, wherein reactive power is simultaneously varied on at least two of a plurality of buses in a grid of said power-generating system.

5. A dynamic method of preventing voltage collapse in a power-generating system, comprising the steps of:

a) generating a look-ahead load margin ranking;
b) generating a look-ahead voltage ranking;
c) combining said look-ahead load margin ranking with said look-ahead voltage ranking to provide an energy management scheme for a power-generating system in which voltage collapse will be prevented in said power-generating system.

6. A dynamic method of preventing voltage collapse in a power-generating system, comprising the steps of:

a) forecasting near-term power flows utilizing a saddle-node theory for a power-generating system having a power-generating grid;
b) determining from forecasts in step (a) load margin value indices that provide an assessment of load demand that said generating system can withstand before saddle-node voltage collapse; and
c) maintaining power-generating capacity of said power-generating system, by preventing voltage collapse of said power-generating system based on said load demand assessment in step (b).

7. The dynamic method of preventing voltage collapse in a power-generating system in accordance with claim 6 further comprising the step of:

d) applying the load margin indices obtained in step (b) to obtain system voltage profiles for said power-generating system, said voltage profiles can be utilized for maintaining power-generating capacity of said power-generating system.

8. The dynamic method of preventing voltage collapse in a power-generating system in accordance with claim 6, wherein step (c) further comprises the step of:

d) adding power-generating capacity to a grid of said power-generating system.

9. The dynamic method of preventing voltage collapse in a power-generating system in accordance with claim 6, wherein step (c) further comprises the step of:

d) shedding load to certain portions of a grid of said power-generating system.

\* \* \* \* \*